March 12, 1968 — A. C. MEYER — 3,372,635

FOOD PREPARATION APPARATUS

Filed Feb. 28, 1966 — 2 Sheets-Sheet 1

INVENTOR.
ALVIN CARROLL MEYER
BY
Fishburn and Gold
ATTORNEYS

March 12, 1968  A. C. MEYER  3,372,635
FOOD PREPARATION APPARATUS
Filed Feb. 28, 1966  2 Sheets-Sheet 2
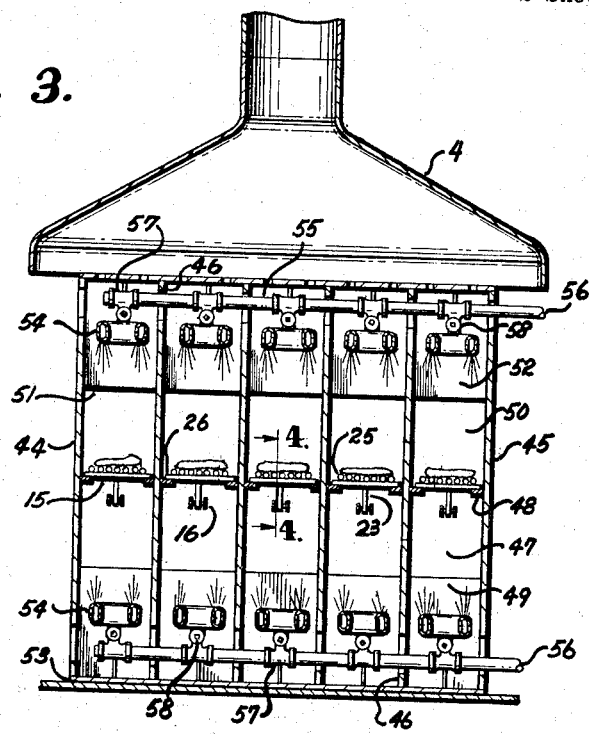
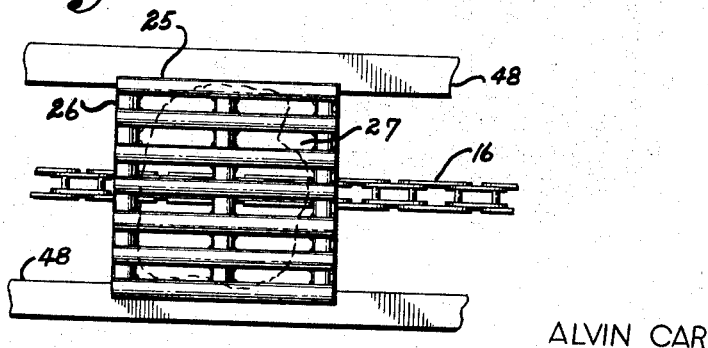
INVENTOR.
ALVIN CARROLL MEYER
BY
ATTORNEYS

United States Patent Office 3,372,635
Patented Mar. 12, 1968

3,372,635
FOOD PREPARATION APPARATUS
Alvin Carroll Meyer, Parkville, Mo., assignor to The Gold Buffet Franchise, Inc., North Kansas City, Mo., a corporation of Missouri
Filed Feb. 28, 1966, Ser. No. 530,685
8 Claims. (Cl. 99—339)

ABSTRACT OF THE DISCLOSURE

Apparatus for cooking of foodstuffs, and particularly steaks, in a commercial eating place, wherein there are a plurality of parallel running conveyors having individual longitudinally spaced grill portions for the steaks and means for operating the conveyors past cooking burners in a housing and for operating the conveyors at different speeds so that when a party orders a plurality of steaks cooked rare, medium or well done, by starting the steaks through the cooking apparatus at the same time they will be deposited from the cooking apparatus cooked in the manner desired. There is also a holding space where the steaks may be kept warm or hot after they have gone through the cooking operation.

---

This invention relates to an apparatus for preparing commodities for human consumption and more particularly, to an apparatus for utilization in preparing such commodities where variations are desired in the level to which the commodity is cooked.

Heretofore, considerable difficulty has been experienced by establishments which prepare commodities for human consumption in the area of regulation of the degree or level to which a commodity, such as steaks, are cooked in order to provide customers with consistency in food preparation. When ordering a steak medium rare, one may, even in the same restaurant, experience a rare steak at one time and a medium steak at a second time. The problem of consistency and degree or level of cooking is made more difficult in establishments such as steak houses where large quantities of food are being prepared to varying degrees or levels of cooking and the separate items of food must be individual handled by the chefs. The level to which an individual item is cooked is largely a matter of the chef's judgment and when individual attention to each item is impossible as when operating rapidly to produce large quantities of such food items, he is unable to apply his judgment or his judgment may be subject to error resulting in customer dissatisfaction.

The principal objects of this invention are to alleviate the aforementioned difficultes in the art by providing an apparatus for cooking commodities for human consumption to selected desired degrees in an expeditious manner to facilitate the preparation of a large quantity of food items with each cooked to the proper level; to provide such an apparatus which will consistently prepare items of food to the desired degree of cooking to standardize the quality of food preparation; to provide such an apparatus which may easily manage the preparation of large quantities of food items to varying degrees of preparation without sacrificing the quality of that preparation; to provide such an apparatus by providing a conveyor system comprised of a plurality of endless driven conveyor runs, each of said runs having means thereon for supporting food items and said system having a driving means operatively connected thereto for operating the individual conveyor runs, a plurality of partitioning means disposed between the spaced conveyor runs defining a plurality of passageways through which at least one of the conveyor runs is extended, each of said passageways having means therein for cooking the food item as it is passed through the passageway on the supporting means of the conveyor runs with the various passageways varying in length in a manner related to the degree or level to which the food item passing through said passageway is to be cooked, said passageways varying between the longest passageway for preparing food items to a well done state or level to the shortest passageway preparing items to a rare state or level; to provide such an apparatus in which the orders from a group or party of customers may be simultaneously prepared for delivery to said customers even though said orders contain food items cooked to various levels in an expeditious manner such that the items are at an optimum temperature level when served to the customers and wherein the orders of a single party may be placed on the apparatus together and removed together to avoid confusion between orders of separate parties; to provide such an apparatus wherein there are separate paths for the food items with the items in each path being cooked to a selected degree and the length of the path, temperature and time of passage are regulated to provide said degree of cooking of the item therein; to provide such an apparatus which may be inexpensively constructed and which may expeditiously manage large quantities of food items to thereby decrease the cost of food preparation and increase the consistency and quality of the food items being prepared.

Other objects and advantages of this invention will become apparent from the following description taken in connection with the accompanying drawings wherein are set forth by way of illustration and example certain embodiments of this invention.

FIG. 3 is a sectional view through the apparatus taken on the line 3—3 in FIG. 1.

FIG. 4 is a fragmentary sectional view through the food item conveyor taken on the line 4—4 of FIG. 3.

FIG. 5 is a top plan view of an individual conveyor run grill on item carrier for supporting a food item to be prepared.

Figure 1:
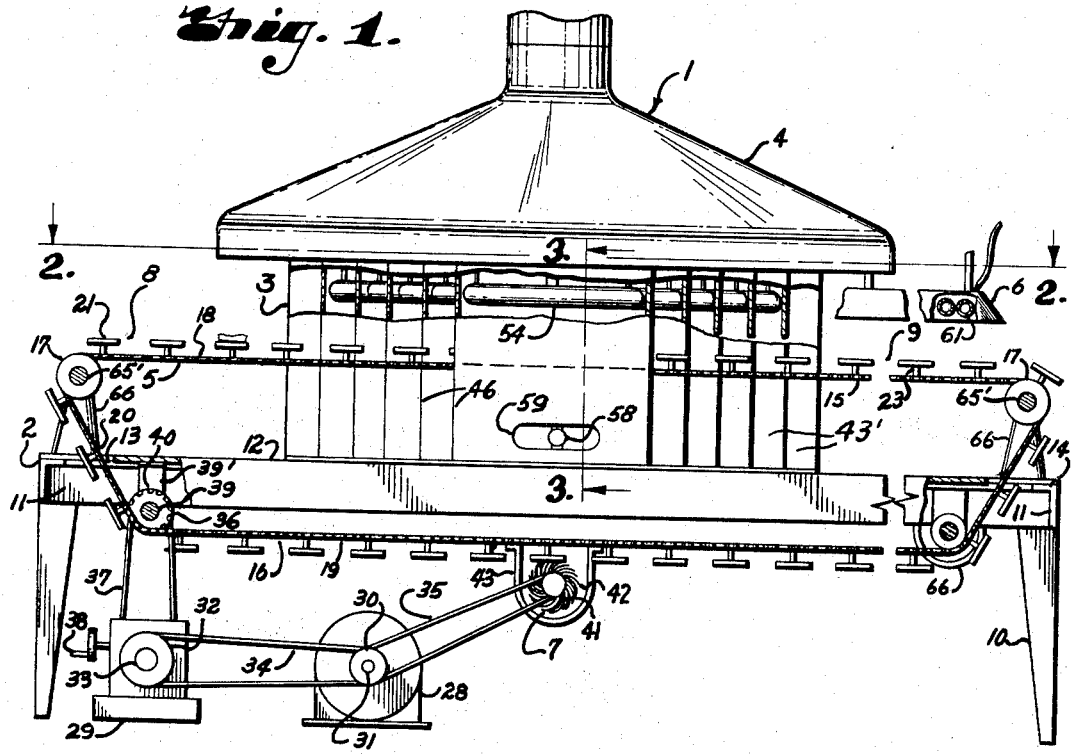
FIG. 1 is a side elevational view of an apparatus embodying the features of this invention with portions broken away to show the interior of said apparatus.

Referring to the drawings in more detail:

The reference numeral 1 generally refers to an apparatus for utilization in the preparation of food commodities wherein variations are desired in the degree to which said commodity is cooked. The apparatus 1 is broadly comprised of a frame or supporting table 2, a housing 3, a ventilating hood 4, a conveyor system 5, a warming means 6 and a conveyor cleaning means 7. It is contemplated that the conveyor system 5 will convey a plurality of food items from a loading station 8 at one side of housing 3 through said housing 3 and outwardly therefrom to an unloading station 9 so that the food items may be cooked while passing through housing 3 and removed from the conveyor system 5 at the unloading station 9. It is further contemplated that the housing 3 in which the food items are to be cooked shall be so constructed that the period of time a food item remains in housing 3 on conveyor system 5 varies depending upon the level to which that item is to be prepared such that a plurality of food items may be passed through housing 3 with each of said items being prepared to a different level of cooking.

The supporting table 2, as illustrated, is comprised of a plurality of supporting legs 10 mounted to a framework 11 which serves to retain a supporting surface 12 in spaced relation from a floor or other supporting surface. The supporting surface 12 on which the housing 3 is mounted defines a pair of recessed areas 13 at its opposed end portions 14 with the conveyor system 5 extending through said recessed areas.

The conveyor system 5 on which the food items are passed through the housing 3 is comprised of a plurality of separate conveyor runs 15 illustrated as being disposed in parallel laterally spaced relation from one another and extending longitudinally of table 2 between the end portions 14. Each of the individual conveyor runs 15 is comprised of an endless conveyor chain 16 which is supported in a conventional manner on a plurality of rollers 17 mounted on a shaft 65' operatively connected to table 2 by brackets 66. The individual runs 15 of the conveyor sytsem 5 are illustrated as having an upper portion 18 disposed in a vertically spaced relation above the supporting surface 12 of table 2 and a lower portion 19 disposed in a vertically spaced relation beneath the supporting surface 12 of table 2. Each of said portions 18 and 19 extend longitudinally of table 2 with said conveyor runs 15 having end portions 20 connecting upper portion 18 and lower portion 19 at each end 14 of the supporting table 2 through the recessed area 13 in said upper surface 12.

Each of the conveyor runs 15 of the conveyor system 5 has a plurality of food supporting means 21 operatively connected thereto. Referring to FIGS. 4 and 5, the food supporting means or carrier 21 is illustrated as a grill 22 having a central stem member 23 which extends from the grill 22 to the chain 16 and is secured thereto by rivets 24. The grill 22 is of a conventional construction comprised of a plurality of longitudinal bars 25 supported by a plurality of transverse bars 26, said bars 25 and 26 being spaced to define a plurality of openings 27 through which heat may be transferred and applied to the undersurface of the food item. It should be noted in FIG. 1 that the conveyor runs 15 are illustrated as having food supporting means 21 disposed in spaced relation about the entire circumference of the endless chain 16 to facilitate the preparation of large quantities of food items and that said grills 22 are disposed in an aligned manner transversely of the supporting surface 12 such that several orders from a single party may be prepared simultaneously and removed at unloading station 9 together to facilitate delivery of the orders at the proper temperature level and to avoid confusion between orders of separate parties.

The individual runs 15 of the conveyor system 5 are separately driven at variable speeds by means of a power source illustrated as a motor 28 operatively connected by means of a drive system to a plurality of variable speed transmissions 29. The motor 28 has a pulley 30 mounted on its shaft 31 by suitable means and operatively connected to a pulley 32 on a drive shaft 33 by a belt 34. The drive shaft 33, as illustrated, is operatively connected to each of the plurality of conveyor runs 15 by a variable speed transmission 29 employing such conventional mechanisms as variably spaced conical discs to facilitate the adjustment of the speed of each of the conveyor runs 15. The variable speed transmissions each have a pulley, not shown, operatively connected to a pulley 36 associated with each of the conveyor runs 15 by a drive belt 37 with the rotational speed of the pulley, not shown, being adjustable by a crank 38 to vary the driving speed of an individual run 15. The pulley 36 of each conveyor run 15 is mounted on a shaft 39 which is connected to the table 2 by a bracket 39'. A sprocket wheel 40 is mounted to shaft 39 to receive and drive chain 16 to move the grills 22 through the housing 3. The speed at which chains 16 are driven may be individually adjusted to vary the time required for passing the food items through housing 3 on each of the conveyor runs 15 to attain the desired level of cooking or the individual conveyor runs may be separately halted to retain a food item in the housing 3 to provide additional cooking time.

The motor 28 also serves to drive the cleaning means 7 which is illustrated as a brush 41 having a plurality of bristles 42 which engage the vertical and transverse bars 25 and 26 of the grill 22 to clean the grill as the individual grills 22 are being passed beneath the supporting surface 12. The brush 41 is axially mounted to a shaft (not shown) which is journaled in bracket 43 which is, in turn, mounted to the supporting table 2. The brush 41 is driven by means of motor 28 which is operatively connected thereto by the belt or chain 35.

The housing 3 which contains the means for heating the food items is illustrated as being comprised of a pair of vertical exterior walls 44 and 45 disposed longitudinally of the supporting table in parallel spaced relation. The exterior side wall 45 has a length considerably less than the exterior side wall 44 thereby defining a generally trapezoidal shaped housing in plan view. A plurality of vertical partitioning means or side walls 46 are disposed between the exterior walls 44 and 45 in a parallel laterally spaced relation to one another and to the exterior walls 44 and 45 defining a plurality of longitudinally extending passageways or conduits 47 through which the individual conveyor runs 15 extend. The partitioning means 46 are of varying lengths thereby defining passageways 47 of varying lengths such that the passageway 47 adjacent the exterior wall 45 is the shortest in length with the passageway 47 adjacent the exterior wall 44 the longest in length and the interior passageways 47 between said exterior passageways being of increasing length from the exterior wall 45 to the exterior wall 44. The variation in length of the passageways provides variations in the length of time that the food items on a particular conveyor run 15 are exposed to the heating means in said housing means as opposed to another food item on another conveyor run 15 to vary the level to which a particular food item is cooked.

The individual conveyor runs 15 are supported within the housing 3 by a plurality of runners 48 which extend longitudinally through the housing 3 and are connected to the partitioning means 46 and the exterior walls 44 and 45 in each of the passageways 47 such that the transverse rods 26 of the grills 22 are maintained in sliding engagement with said runners 48 as the grills 22 pass through the housing 3. The housing 3 also has a plurality of pairs of end panels 49 mounted to the partitioning means 46 and exterior walls 44 and 45 and disposed in a vertically spaced relation from one another at each end of the individual passageways 47 to define a centrally open area or aperture 50 with the individual runs 15 of the conveyor system 5 extending therethrough. Each of the individual passageways have an upper plate or panel 51 mounted to the side walls 44, 45 or 46 of the individual passageway 47, each defining a plurality of apertures 52 through which smoke from the cooking operation may be transmitted to the overlying hood structure 4 which is operatively connected in a conventional manner to an exhaust system (not shown). In the illustrated embodiment, the housing 3 also has a floor panel 53 which underlies the individual passageways 47 and is mounted to the side walls 44, 45 and 46.

Each of the individual passageways 47 has a heating means disposed therein in vertically spaced underlying and overlying relation to the individual conveyor runs 15 passing through the individual passageways 47. In the illustrated embodiment, the heating means is shown as gas burners 54. The gas burners 54 are positioned on a gas distribution system 55 comprised of a central inlet pipe 56 having a plurality of pipe T's 57 mounted thereto in a conventional manner, said gas inlet pipe 56 extending transversely through each of the individual passageways 47 and outwardly from the housing 3 to a fuel supply system. A pair of gas burners 54 are operatively connected to each of the pipe T's 57 in a conventional manner and extend longitudinally of passageway 47 in opposite directions. Each of the pairs of gas burners 54 in the separate passageways 47 are illustrated as varying in length in accordance with the length of the passageway 47. The burners 54, as illustrated, each have a valving mechanism 58 suitably mounted between the pipe T's 57 and the burners 54 to effect a regulation of the flow of gas to burners 54 thereby regulating the temperature attained in each of the passageways 47. Through accurate control of the temperature levels within passageways 47 and the speed of conveying the food items through said passageways 47, the level to which the food items are cooked may be closely maintained providing consistency in food preparation to the desired and suitable degree of cooking. An aperture 59 in each of the exterior side walls 45 and 44 and the partitions 46 allows access to each of the valve mechanisms.

As a customer order is received by the restaurant chef dictating a plurality of food items such as steaks to be cooked at varying levels, such as rare, medium and well done, the steaks ordered may be placed on adjacent supporting grills 22 of different conveyor runs 15 at the loading station 8 adjacent the housing 3. The conveyor 5 which may be maintained in continuous motion through busy periods or with a convenient switching device activated and deactivated as needed, then conveys the steaks through the apertures 50 in the housing 3 in separate passageways 47 at a predetermined speed with the rare steak, for example, passing through passageway 47 adjacent the side wall 45, the medium steak passing through the center passageway 47 and the well done steak passing through the passageway 47 adjacent the side wall 44. As the steaks are conveyed through the individual passageways 47 in the housing 3, the gas burners 54 apply heat to both the upper and lower surfaces of said steak, thereby cooking the meat to the desired level. The meat then passes from the housing 3 on the grills 22 through apertures 43' in the ends of the individual passageways 47 to the unloading station 9. The heating level in each passageway 47 and the speed of each of the conveyor runs 15 may be individually regulated to control the quality of the food preparation.

Figure 2:
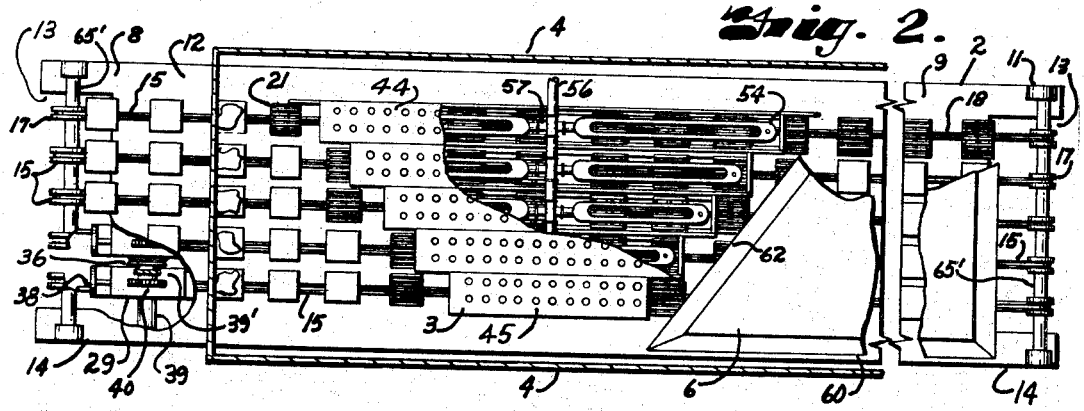
FIG. 2 is a sectional view of the apparatus taken on the line 2—2 of FIG. 1, with portions thereof broken away to show the interior of said apparatus.

A warming means 6 is disposed above the unloading station 9 having means for keeping the food items or steaks hot after they have passed through the housing 3 and until delivery to the customer, such as some form of radiant heating. As illustrated in FIGS. 1 and 2, the warming means 6 is comprised of an overhead heat shield 60, a plurality of radiant heating means 61 operatively mounted therein, said heating shield 60 having an end portion 62 adjacent the housing 3 formed in an angular manner conforming to the shape of the end portion of housing 3 to reduce the heat loss in the food items passing out from the shorter passageways 47. After the steaks are passed through the housing 3 and cooked to the desired level, the rare steak passes from said housing 3 before the well done steak, yet all three steaks are to be delivered to a single group of customers at the same time; therefore, the rare steak would be removed from the unloading station 9 at the same time as the removal of the medium and well done steak. The heat loss from the rare steak is reduced by the utilization of the overhead warming means 6 while the rare steak is being conveyed outside housing 3 as the well done steak is being cooked, such that hot steaks may be served to all members of the same party at the same time.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. An apparatus for cooking food items to various levels comprising:
    (a) a frame,
    (b) a conveyor system operatively mounted on said frame having a plurality of spaced conveyor runs, each of said runs having means operatively connected thereto for supporting item of food, said system including a means for driving said conveyor runs,
    (c) a plurality of partition means disposed between said conveyor runs defining a plurality of passageways with at least one conveyor run extending through each of said passageways,
    (d) means mounted in each of said passageways to cook the food items being passed through one of said passageways to a level of preparation differing from that of the items passing through the other passageways so as to provide food items cooked to various levels in an expeditious manner, the cooking means disposed in each of the plurality of passageways being of a different length to provide variations in the degree to which a food item is cooked.

2. An apparatus for cooking food items as recited in claim 1 wherein the plurality of partitions between the conveyor runs are of different lengths corresponding to the length of the cooking means defining individual passageways of varying lengths.

3. An apparatus for cooking food items to various levels comprising:
    (a) a frame,
    (b) a conveyor system operatively mounted on said frame having a plurality of spaced conveyor runs, each of said runs having means operatively connected thereto for supporting items of food, said system including a means for driving said conveyor runs,
    (c) a plurality of partition means disposed between said conveyor runs defining a plurality of passageways with at least one conveyor run extending through each of said passageways,
    (d) means mounted in each of said passageways to cook the food items being passed through one of said passageways to a level of preparation differing from that of the items passing through the other passageways so as to provide food items cooked to various levels in an expeditious manner, the means for cooking the food items being comprises of a plurality of burners mounted in said passageways of varying lengths to provide variation in the degree of cooking of the items in the various passageways.

4. An apparatus for cooking food items as recited in claim 3 wherein the burners are mounted above and below the conveyor runs passing through each of asid passageways.

5. An apparatus for cooking food items as recited in claim 4 wherein the means operatively connected to the conveyor runs for supporting the items of food is comprised of a grill to allow for direct application of heat to both the upper and lower surfaces of the food item.

6. An apparatus for cooking food items as recited in claim 4 including, housing means for said conveyor system, and a warming means located adjacent said housing means to reduce the transfer of heat from the food items leaving said housing means.

7. An apparatus for cooking food items to various levels comprising:
    (a) a frame,
    (b) a conveyor system operatively mounted on said frame having a plurality of spaced conveyor runs, each of said runs having means operatively connected thereto for supporting items of food, said system including a means for driving said conveyor runs,
    (c) a plurality of partition means disposed between said conveyor runs defining a plurality of passageways with at least one conveyor run extending through each of said passageways,
    (d) means mounted in each of said passageways to cook the food items being passed through one of said passageways to a level of preparation differing from that of the items passing through the other passageways so as to provide food items cooked to various levels in an expeditious manner, the conveyor system being comprised of a plurality of laterally spaced parallel conveyor runs and housing means for said system and wherein said housing means has a pair of exterior side walls with a plurality of laterally spaced partitions disposed betwen said conveyor runs defining a plurality of individual passageways through which a conveyor run extends to convey items of food through said passageway.

8. An apparatus for cooking food items as recited in claim 7 wherein a burner means is mounted in each of said passageways in said housing means and extends longitudinally of said passageways and each of the plurality of burner means varies in its longitudinal length to provide variations in the degree to which the food items are cooked.

References Cited

UNITED STATES PATENTS

| | | | |
|---|---|---|---|
| 712,533 | 11/1902 | Hewlett | 263—8 |
| 1,458,021 | 6/1923 | Bamford | 99—443 |
| 1,473,213 | 11/1923 | De Matteis | 99—386 |
| 1,524,532 | 1/1925 | Biebel | 99—386 |
| 1,555,336 | 9/1925 | Vaughn | 99—386 X |
| 1,599,556 | 9/1926 | Cook | 99—386 |
| 1,820,745 | 8/1931 | Kater | 99—386 X |
| 2,225,068 | 12/1940 | Marriott | 99—386 X |
| 2,419,261 | 4/1947 | Grotchen | 99—448 X |
| 2,470,446 | 5/1949 | Rankin | 99—443 X |
| 2,928,524 | 3/1960 | Jensen | 198—76 |

BILLY J. WILHITE, *Primary Examiner.*